(12) United States Patent
Chellappa

(10) Patent No.: US 7,780,346 B2
(45) Date of Patent: Aug. 24, 2010

(54) METHODS AND APPARATUS FOR A FULLY ISOLATED NPN BASED TEMPERATURE DETECTOR

(75) Inventor: Ananthasayanam Chellappa, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 404 days.

(21) Appl. No.: 11/931,999

(22) Filed: Oct. 31, 2007

(65) Prior Publication Data

US 2009/0110027 A1 Apr. 30, 2009

(51) Int. Cl.
*G01K 7/00* (2006.01)

(52) U.S. Cl. ........................ 374/178; 327/512

(58) Field of Classification Search ................ 374/178; 327/512
See application file for complete search history.

(56) References Cited

U.S. PATENT DOCUMENTS

| | | | |
|---|---|---|---|
| 6,815,941 B2 | 11/2004 | Butler | |
| 7,253,599 B2 | 8/2007 | Chen et al. | |
| 2002/0167349 A1* | 11/2002 | Rincon-Mora | 327/513 |
| 2004/0036460 A1* | 2/2004 | Chatal | 323/313 |
| 2005/0088245 A1* | 4/2005 | Isobe | 331/57 |
| 2006/0044047 A1* | 3/2006 | Porter | 327/512 |
| 2006/0111865 A1* | 5/2006 | Choi | 702/130 |
| 2007/0160114 A1* | 7/2007 | Kim | 374/178 |
| 2007/0216468 A1* | 9/2007 | Duarte | 327/513 |
| 2008/0061863 A1* | 3/2008 | De Barros Soldera et al. | 327/512 |
| 2008/0192804 A1* | 8/2008 | Ryu | 374/178 |

OTHER PUBLICATIONS

Rincón-Mora, G.A. "Bandgap Voltage Reference" ECE4430 Analog Integrated Circuits, 14 pages (metadata indicates document created on Dec. 2, 2002).
"Introduction to Bandgap Reference Generators," Texas A&M University, 607(ESS), 18 pages (metadata indicates document created on Feb. 10, 2005).

* cited by examiner

*Primary Examiner*—Lisa M Caputo
*Assistant Examiner*—Mirellys Jagan
(74) *Attorney, Agent, or Firm*—John J. Patti; Wade J. Brady, III; Frederick J. Telecky, Jr.

(57) ABSTRACT

Methods and apparatus for a fully isolated NPN-based temperature detector are disclosed. A disclosed method to determine the temperature of a circuit comprises generating a first current that increases as temperature increases, generating a second current that decreases as temperature increases, and detecting the temperature by receiving a first and second signal based on the first and second currents to determine whether the temperature exceeds at least one temperature threshold.

11 Claims, 10 Drawing Sheets

METHODS AND APPARATUS FOR A FULLY ISOLATED NPN BASED TEMPERATURE DETECTOR

TECHNICAL FIELD

The present disclosure pertains to voltage bandgap references and, more particularly, to methods and apparatus for a fully isolated NPN-based temperature detector.

BACKGROUND

Bandgap voltage references are circuits that generate a temperature-stable voltage by combining a p-n junction voltage with a thermal voltage. In many circuits and devices (e.g., analog-to-digital converters, etc.), a precise voltage reference is required to operate the circuits and/or devices at a precise level. Persons of skill in the art will readily appreciate that temperature affects a threshold voltage at which a transistor operates. Generally, a bandgap reference is used to generate such a reference voltage that is temperature independent. To form a bandgap reference, a complementary-to-absolute-temperature (CTAT) voltage reference is generated that decreases with increasing temperature (i.e., the CTAT voltage has a negative temperature coefficient). The bandgap reference also forms a proportional-to-absolute-temperature (PTAT) voltage that increases with increasing temperature (i.e., the PTAT voltage has a positive temperature coefficient). When the PTAT and CTAT voltages are combined properly, their respective temperature coefficients cancel each other out, thereby resulting in a temperature stable voltage. In other examples, a PTAT voltage is also generated for other purposes (e.g., to provide a voltage that varies and represents temperature, etc.).

FIG. 1 illustrates a known fully isolated NPN-based bandgap reference circuit 100 including a PTAT voltage reference generator. Generally, in a fully isolated circuit, the only nodes that are coupled with the substrate are solid nodes (e.g., ground, voltage supply, etc.), thereby preventing collecting charge carriers from being injected into the example circuit 100 by other circuits. To isolate the example circuit 100 of FIG. 1, the fabrication process provides an NPN transistor having a collector that is an N-type well. The NPN transistor also includes the base and emitter in the N-type well. In FIG. 1, the example circuit includes a voltage supply 101, a transistor 102, and a transistor 104 having a larger current density than the transistor 102, thereby requiring a larger base-emitter voltage than the transistor 102 before the second transistor 104 will turn on. The transistors 102, 104 are isolated by coupling their respective collectors directly to the voltage supply 101. A resistor 109 is placed in series with the transistor 102 to measure the difference between the base-emitter voltages of the transistors 102, 104. A resistor 108 is placed in parallel with the transistor 102 and a resistor 108 having a substantially equal resistance to resistor 106 is placed in parallel with the transistor 104. The resistor 109 and the resistor 106 are coupled at node 110 and the emitter of the transistor 104 is coupled to the resistor 108 at node 115.

The nodes 110 and 115 are also the inputs of a control circuit 120, which mirrors the voltages and currents between the nodes 110, 115. In other words, the voltages at nodes 110 and 115 are substantially equal and the current flowing from nodes 110 and 115 into the control circuit 120 are also substantially equal. The transistor 104 sets the voltage at node 115 to the base-emitter voltage drop below the voltage supply 101. Therefore, the current flowing through the resistor 108 is the base-emitter junction voltage of the transistor 104 divided by the resistance of the resistor 108. As temperature increases, the base-emitter voltage decreases, thereby causing the current through resistor 108 to be the CTAT current, $I_{CTAT}$. The voltage at the node 110 is forced to be the voltage of node 115, thereby forcing the CTAT current to also flow into node 110 via the resistor 106.

Additionally, because the transistors 102 and 104 have different current densities, their respective base-emitter junction voltages differ and the current flowing through the resistor 109 will be the based on the difference in the base-emitter junction voltages of the transistors 102 and 104 and the resistance value of the resistor 109. As temperature increases, the increasing difference in the base-emitter voltages of transistors 102 and 104 cause the current flowing through the resistor 109 to increase, thereby causing the voltage across the resistor 109 to increase as temperature increases. Thus, the current flowing through resistor 109 forms the PTAT current, $I_{PTAT}$. The sum of the PTAT current and the CTAT current is the constant current, $I_{CONST}$. In the example of FIG. 1, the CTAT current, $I_{CTAT}$, and PTAT current, $I_{PTAT}$, are generated in a single voltage loop.

However, to sense the PTAT voltage $V_{PTAT}$, an operational amplifier 130 is coupled to the node 115. The operational amplifier 130 forces the voltage at an emitter of a transistor 140 to be the difference between the base-emitter voltage of the transistor 140 and the voltage source (i.e., $V_{SS}-V_{BE}$). In the example of FIG. 1, the transistor 140 may have the same current density as the transistor 102. Because the base and collector of the transistor 140 are coupled to the voltage source and the voltage across the base-emitter junction is forced by the operational amplifier 130, the transistor 140 is forced to source the PTAT current. To generate the PTAT voltage, a current mirror 150 may be implemented to mirror the current, thereby copying the PTAT current and forming PTAT voltage drop across the resistor 160.

DETAILED DESCRIPTION

Generally, the disclosed systems and methods produce a bandgap reference. As described herein with reference to examples, in a bandgap reference, a complementary-to-absolute-temperature (CTAT) voltage reference and a proportional-to-absolute-temperature (PTAT) voltage reference may be formed. In a bandgap reference, the CTAT current and the PTAT current may be combined to form a reference (e.g., a current, a voltage, etc.) that is substantially constant as temperature changes. In some examples, the bandgap reference may also sense and generate a PTAT voltage reference that may be used for, among other things, temperature sensing. Additionally, in other examples, temperature detectors and methods to detect temperature are disclosed.

In general, the PTAT reference has a positive temperature coefficient and the CTAT reference has a negative temperature coefficient. However, the PTAT and CTAT temperature coefficients may not have substantially equal magnitudes, thereby preventing the temperature coefficients from canceling. In such examples, the CTAT and/or PTAT reference may be scaled by any suitable method such that the magnitude of the temperature coefficients are substantially equal, thereby canceling out the temperature coefficients by combining the CTAT and PTAT reference.

Generally, in the described examples and for the sake of clarity, the resistors of a bandgap reference do not have a temperature coefficient. In other words, the resistor resistance is substantially constant as the temperature of the system increases and/or decreases. However, in some examples, the resistors may still have a temperature coefficient. In such cases, the temperature coefficients of the PTAT current and/or CTAT current are affected by the temperature coefficients of the resistors. Accordingly, the CTAT and PTAT generation may be carried out to compensate for any resistance variation over temperature.

I. Bandgap Reference with PTAT Reference

Figure 2:
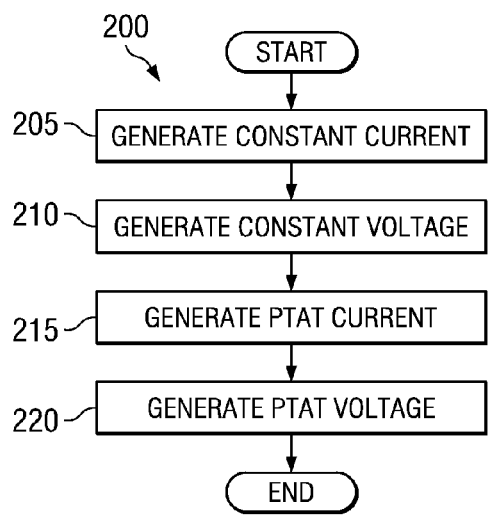
FIG. 2 is a flowchart of an example process to generate a bandgap reference.

FIG. 2 illustrates an example process 200 to implement a bandgap reference with a PTAT voltage reference in an electronic system. In the example of FIG. 2, the example process 200 starts by generating the constant current, $I_{CONST}$ (block 205). In the example of FIG. 2, the constant current is substantially constant as temperature changes. After forming the constant current, the example process 200 generates a constant voltage, $V_{CONST}$ (block 210). The example process 200 then senses the PTAT current, $I_{PTAT}$, (block 215) and then forms the PTAT voltage, $V_{PTAT}$ (block 220).

Figure 3:
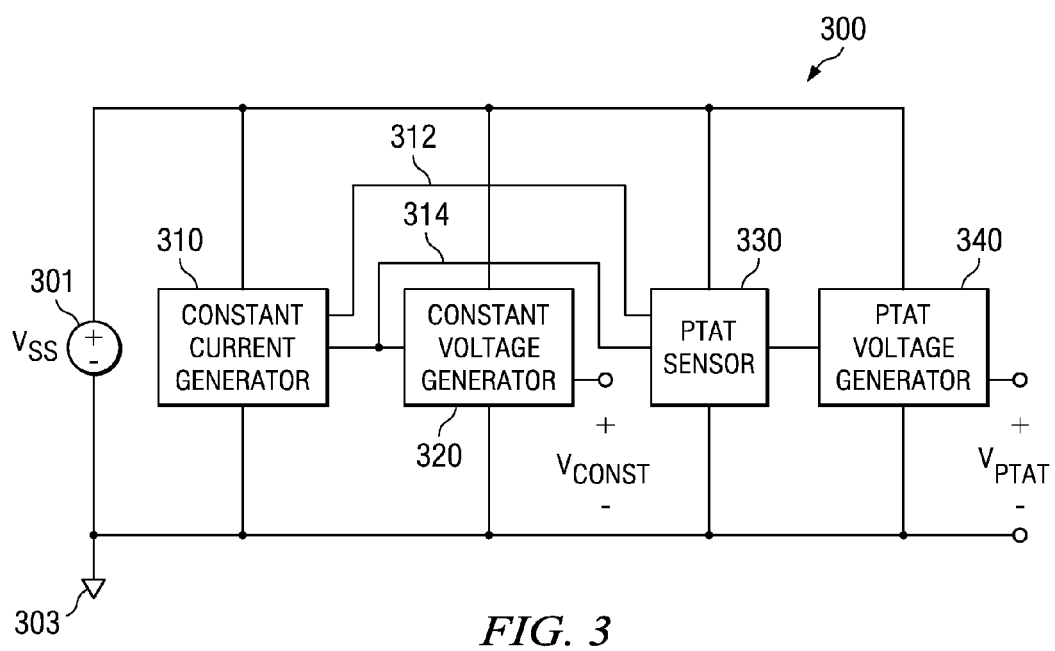
FIG. 3 is a block diagram of an example circuit to implement the example process of FIG. 2.

FIG. 3 illustrates a block diagram of an example circuit 300 to implement the example process 200 of FIG. 2. In the example of FIG. 3, a voltage source 301 and a ground reference 303 (e.g., a low signal, a system ground, etc.) are coupled to a constant current generator 310, a constant voltage generator 320, a PTAT sensor 330, and a PTAT voltage generator 340. In the example of FIG. 3, the constant current generator 310 generates a constant current (i.e., the current is substantially constant as temperature changes). The constant current generator 310 outputs a first signal on line 312 to reproduce the constant current and a second signal on line 314 to reproduce the base-emitter junction voltage (i.e., $V_{BE}$) of a transistor. Additionally, the constant voltage generator 320, the PTAT sensor 330, and/or the PTAT voltage generator 340 may be implemented in other device(s) and/or component(s) of the electronic system.

The constant voltage generator 320 receives the first signal from the constant current generator 310 for the purpose of producing a ground-referenced voltage that is substantially constant with temperature (i.e., $V_{CONST}$). The PTAT sensor 330 also receives the first and second signals from the constant current generator 310. In response to the first and second signals, the PTAT sensor 330 senses the PTAT voltage to generate the PTAT current. The PTAT sensor 330 outputs a signal to the PTAT voltage generator 340, which the PTAT voltage generator 340 uses to produce a ground-referenced PTAT voltage (i.e., $V_{PTAT}$).

Figure 4A:
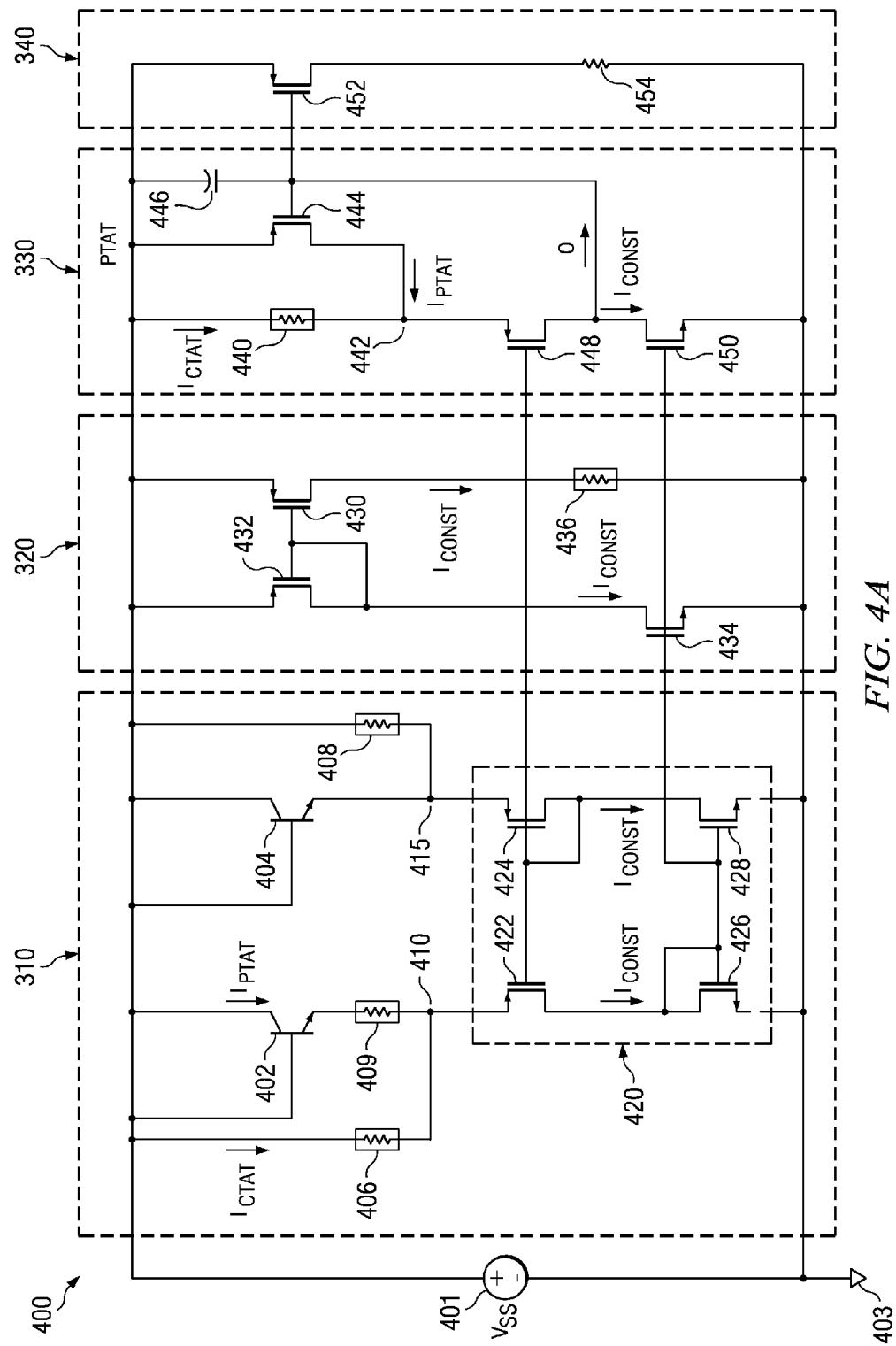
FIGS. 4A and 4B are schematic diagrams of example circuits to implement the example process of FIG. 2 and/or the block diagram of FIG. 3.

FIG. 4A is a schematic of an example circuit 400 that implements the example process 200 of FIG. 2. In the example of FIG. 4A, similar reference numerals are used to denote similar portion or components as shown in FIG. 3. In particular, the constant current generator 310 receives a voltage source 401 via an NPN transistor 402, an NPN transistor 404, a resistor 406, and a resistor 408. The resistors 406 and 408 are configured to have equal or substantially equal resistances. To form a diode via the NPN transistor 402, the voltage source 401 is coupled to both the base and collector of the NPN transistor 402. The voltage source 401 is also coupled to both the base and collector of the NPN transistor 404 to form a second diode.

The emitter of the NPN transistor 402 is coupled to a resistor 409 that is further coupled to a first node 410. As described above, the resistor values of the examples are selected to be substantially equal over temperature. The first node 410 is also coupled to the voltage source 401 via the resistor 406 and a first input of a control circuit 420. The emitter of the NPN transistor 404 is coupled to a second node 415. The node 415 is also coupled to both the voltage source 401 via the resistor 408 and a second input of the control circuit 420. As will be explained below, the CTAT current flows through the resistors 406 and 408 and the PTAT current flows via transistors 402 and 404.

In the example of FIG. 4A, the control circuit 420 receives the first input via a source of a p-channel metal-oxide-semiconductor field effect transistor (PMOS) 422 and also receives the second input via a PMOS transistor 424. The drain of the PMOS transistor 422 is coupled to the gate and the drain of a first N-channel metal-oxide-semiconductor field effect transistor (NMOS) 426, all of which are further coupled to a gate of an NMOS transistor 428. The gate of the PMOS transistor 422 is coupled to both the gate and the drain of the PMOS transistor 424, all of which are further coupled to the drain of the NMOS transistor 428. The sources of both NMOS transistors 426 and 428 are coupled to ground 403.

In the example of FIG. 4A, the NMOS transistors 426 and 428 are matched, meaning that the transistors 426, 428 are configured to have substantially identical device parameters (e.g., gate width-to-length ratios, etc.). Similarly, the PMOS transistors 422 and 424 are also matched. Though the example control circuit 420 comprises NMOS and PMOS transistors, persons of ordinary skill in the art will readily appreciate that any active device (e.g., NPN transistors, PNP transistors, etc.) may implement the control circuit 420.

However, for the sake of clarity in the operation of the constant current generator 310, the description begins with the operation of the control circuit 420. In general, as described above, the currents flowing into the drains of the PMOS transistors 422, 424 are substantially equal and the voltage at the source of the PMOS transistors 422, 424 are also substantially equal. Persons of ordinary skill in the art will readily appreciate that the drain-source current of an NMOS transistor or a PMOS transistor in saturation is described by equation 1.

$$I_{DS} = \mu_n C_{OX} \frac{W}{L}(1+\lambda V_{DS})(V_{GS} - V_{th}) \quad \text{[Equation 1]}$$

where $\mu_n$ is the average carrier mobility, $C_{OX}$ is the gate oxide capacitance per unit area, W is the gate width, L is the gate length, $\lambda$ is the channel-length modulation parameter, $V_{DS}$ is the drain-source voltage, $V_{GS}$ is the gate-source voltage, and $V_{th}$ is the threshold voltage of the transistor. As described above, the gates of the NMOS transistors 426 and 428 are coupled together and the sources of the NMOS transistors 426 and 428 are both coupled to ground, thereby forcing the NMOS transistors 426 and 428 to have substantially equal gate-source voltages. Thus, by matching the NMOS transistors 426, 428, their drain-source currents will also be substantially equal.

By coupling the drain and the gate of the NMOS transistor 426, the NMOS transistor 426 sets its gate-source voltage to allow the drain-source current to flow through the NMOS transistor 426. As described above, the same gate-source voltage is applied to the gate of the NMOS transistor 428, thereby forcing the drain-source current of the NMOS transistor 428 to be equal or substantially equal to the drain-source current of the NMOS transistor 426. Persons having ordinary skill in the art will readily appreciate that NMOS transistors 426 and 428 form a current mirror whereby NMOS transistor 428 mirrors (i.e., substantially copies) the reference current of the NMOS transistor 426. Moreover, the additional current mirrors may be implemented by any active device (e.g., PMOS transistors, NPN bipolar transistors, etc.) without affecting the current flowing through the NMOS transistor 426.

As described above, the drain-source currents of the NMOS transistors 426 and 428 are configured to be equal or substantially equal. Due to NMOS transistors 426, 428, the drain-source currents from the PMOS transistors 422 and 424 must also be equal or substantially equal. In the example of FIG. 4A, the PMOS transistors 422 and 424 are matched, thereby forcing the gate-source voltages of the PMOS transistors 422 and 424 to be equal or substantially equal. Thus, the controller 420 forces the voltages at the nodes 410, 415 to be substantially equal and also forces the currents flowing from nodes 410, 415 to be substantially equal.

In the constant current generator 310, the NPN transistor 404 is configured to operate as a diode and reduces the voltage at the node 415 based on the base-emitter junction voltage (i.e., $V_{BE1}$) of the NPN transistor 404. In other words, the voltage applied to both nodes 410 and 415 is forced by the NPN transistor 404, and the voltages are described by equation 2.

$$V_{410}, V_{415} = V_{SS} - V_{BE404} \quad \text{[Equation 2]}$$

where $V_{410}$ and $V_{415}$ are the voltages at nodes 410 and 415, respectively, $V_{BE404}$ is the base-emitter reference voltage drop across the base-emitter junction of the NPN transistor 404, and $V_{SS}$ is the voltage of the voltage source 401. Because the voltage at nodes 415 and 410 are forced to be equal, the current flowing through the resistors 406 and 408 are also known by equations 3 and 4.

$$I_{R406} = \frac{V_{BE404}}{R_{406}} \quad \text{[Equation 3]}$$

$$I_{R408} = \frac{V_{BE404}}{R_{408}} \quad \text{[Equation 4]}$$

where $V_{BE404}$ is the base-emitter voltage across the NPN transistor 404 and R is the resistance value of resistors the 406 and 408.

As described above, the currents flowing from the nodes 410 and 415 to the control circuit 420 are equal or substantially equal. Additionally, the currents from resistors 406 and 408 are also equal or substantially equal, thereby causing the current flowing across the NPN transistors 402 and 404 to be equal or substantially equal. In the example of FIG. 4A, the current flowing through the NPN transistor 402 determines the current flowing across the NPN transistor 404. To control the current across the NPN transistors 402 and 404, the NPN transistor 402 is selected to have a smaller current density than the NPN transistor 404 so that the base-emitter junction voltage is smaller, thereby configuring the NPN transistor 402 as a diode with a smaller base-emitter voltage (i.e., $V_{BE}$). A voltage loop equation for the NPN transistors 402 and 404 is shown in equation 5.

$$V_{BE404} + V_{GS424} - V_{GS422} - I_{402}R_{409} - V_{BE402} = 0 \quad \text{[Equation 5]}$$

where $V_{BE404}$ is the base-emitter voltage of the NPN transistor 404, $V_{GS424}$ and $V_{GS422}$ are the respective gate-source voltage of the PMOS transistors 422 and 424, $I_{402}$ is the current flowing across the NPN transistor 402, $R_{409}$ is the resistance of resistor 409 and $V_{BE402}$ is the base-emitter voltage of the NPN transistor 402. Solving for current, the current that flows across the NPN transistors 402 and 404 is described in equation 6.

$$I_{402}, I_{404} = \frac{V_{BE404} - V_{BE202}}{R_{409}} = \frac{\Delta V_{BE}}{R_{409}} = I_{PTAT} \quad \text{[Equation 6]}$$

where $\Delta V_{BE}$ is the difference in the base-emitters voltages between the NPN transistors 402 and 404 (i.e., $\Delta V_{BE} = V_{BE404} - V_{BE402}$) and $R_{409}$ is the resistance of resistor 409. Additionally, as described above, the resistances of the resistors are substantially constant over temperature.

In the constant current generator 310, the thermal voltages (i.e., $V_T = k*T/q$, where k is Boltzmann's constant, T is temperature, and q is the charge of an electron) of the NPN transistors 402 and 404 increase as temperature increases. As a result, the thermal voltage causes the emitter currents of the NPN transistors 402 and 404 to decrease. The emitter current flowing via the NPN transistors is described by equation 7.

$$I_E = J_S A \left( e^{\frac{V_{BE}}{V_T}} - 1 \right) \quad \text{[Equation 7]}$$

where $J_S$ is the current density, A is the emitter size, $V_{BE}$ is the base emitter junction, and $V_T$ is the thermal voltage. Due to the smaller current density of the NPN transistor 402, the emitter current (i.e., $V_{BE402}$) increases with temperature at a greater rate than the emitter current (i.e., $V_{BE404}$) of the NPN transistor 404, thereby causing the current flowing through resistor 409 to increase. In other words, the current flowing through resistor 409 increases as temperature increases (i.e., the current has a positive temperature coefficient). Therefore, the current flowing via resistor 409 is proportional-to-absolute-temperature (i.e., the PTAT current). Given the ratio between the emitter sizes of transistors 402 and 404, the PTAT voltage is found per equation 8.

$$V_{PTAT} = \Delta V_{BE} = V_T \ln(N) \quad \text{[Equation 8]}$$

where N is the ratio between the emitter sizes of transistors 402 and 404, and $V_T$ is the thermal voltage.

In contrast, the base-emitter junction voltage of transistor 404 decreases as temperature rises, which thereby increases the voltage at nodes 410, 415. Thus, the current flowing into the nodes 410 and 415 via resistors 406 and 408, respectively, decreases as temperature increases. That is, the current flowing into nodes 410 and 415 via resistors 406 and 408, respectively, is complementary-to-absolute-temperature (i.e., the current has a negative temperature coefficient). The CTAT current and the PTAT current are described by:

$$I_{PTAT} = \frac{\Delta V_{BE}}{R_{409}} \quad \text{[Equation 9]}$$

$$I_{CTAT} = \frac{V_{BE404}}{R_{406}} \quad \text{[Equation 10]}$$

where $\Delta V_{BE}$ is the difference in the base-emitter voltages between the NPN transistors 402 and 404 (i.e., $\Delta V_{BE} = V_{BE404} - V_{BE402}$), $R_{409}$ is the resistance of resistor 409, and $R_{406}$ is the resistance value of resistor 406. The current flowing out of the nodes 410, 415 is the sum of the CTAT current and the PTAT current. In some examples, the negative temperature coefficient of the CTAT current and the positive temperature coefficient of the PTAT current cancel each other out (e.g., via a ratio between resistors 406 and 409), thereby forming a constant current ($I_{CONST}$) that is substantially constant over a change temperature.

A first signal is output from the constant current generator 310 via the gates of the NMOS transistors 426 and 428. As described above, the NMOS transistors 428 and 426 force the gate-source voltage to draw the reference current at node 410 (i.e., the constant current). A second signal is also output from the constant current generator 310 via the gates of the PMOS transistors 422 and 424. As described above, the gate-source voltage of the PMOS transistors 424 is set by the constant current, thereby forcing the gate-source voltage of the PMOS transistor 422 to mirror the voltage of node 415.

In the example of FIG. 4A, the constant voltage generator 320 may be implemented by a PMOS transistor 430, a PMOS transistor 432, an NMOS transistor 434, and a resistor 436. The sources of both the PMOS transistors 430 and 432 are coupled to the voltage source 401. The gates of the PMOS transistors 430 and 432 are coupled to both the drain of the NMOS transistor 434 and the drain of the PMOS transistor 434. The NMOS transistor 434 receives the first output of the constant current generator 310 via its gate and its source is coupled to ground 403. The drain of the PMOS transistor 432 is coupled ground 403 via the resistor 436. Additionally, the NMOS transistor 434 is configured to match the NMOS transistor 426. Similarly, the PMOS transistors 430, 432 are also matched.

The constant voltage generator 320 operates by receiving the gate-source voltage of the NMOS transistor 426 via the gate of the NMOS transistor 434. The gate-source voltage of the NMOS transistor 434 is thereby set to have the same gate-source voltage as NMOS transistor 426, thereby mirroring the constant current. Similarly, because the gates of the PMOS transistors 430 and 432 are coupled, their respective drain-source currents must also be equal or substantially equal. By coupling the drain and gate of the PMOS transistor 430 to each other, the PMOS transistor 430 forces its gate-source voltage to draw the current that the NMOS transistor 434 sinks (i.e., the constant current). The PMOS transistor 432 thereby forces the constant current across the resistor 436 to generate a ground referenced constant voltage and the output of the constant voltage generator 320 is formed across the resistor 436. In some examples, the resistance of resistor 436 is selected to have a resistance substantially equal to the value of resistors 406 and 409. However, in other examples, the resistance of resistor 436 is selected to scale the constant voltage by a multiple (i.e., a ratio).

In the example of FIG. 4A, the PTAT sensor 330 is formed by a resistor 440 that couples the voltage source 401 to a node 442. The source of a PMOS transistor 444 is coupled to the voltage source 401 and its gate is coupled to the voltage source 401 via a capacitor 446. Persons of ordinary skill in the art will readily appreciate that the capacitor 446 is optional and merely provides compensation to provide stability to the example circuit 400. The drain of the PMOS transistor 444 is further coupled to the source of a PMOS transistor 448 via the node 442. The PMOS transistor 448 receives the second output signal of the constant current generator 310 via its gate and its drain is coupled to the drain of an NMOS transistor 450. The NMOS transistor 450 receives the first output signal of the constant current generator 310 (i.e., the gate-source voltage of the NMOS transistors 426 and 428) via its gate and its source is coupled to ground 403. The drain of the PMOS transistor 448 is also coupled to the gate of the PMOS transistor 444.

In the example of FIG. 4A, the NMOS transistor 450 is configured to match the NMOS transistor 426. Additionally, the PMOS transistors 444 and 448 are configured to match each other. The value of resistor 440 is equal or substantially equal to resistors 406 and 408.

The PTAT sensor 330 operates by sinking the constant current and subtracting the CTAT current to generate the PTAT current. By receiving the first output signal from the constant current generator 310, the NMOS transistor 450 mirrors the drain-source current of the NMOS transistor 426 (i.e., the constant current). Persons of ordinary skill in the art will readily appreciate that no current can flow from the drain of the PMOS transistor 448 into the gate of the PMOS transistor 444.

As described above, the gate of the PMOS transistor 448 receives the gate voltage of the PMOS transistor 424. The current flowing through PMOS transistor 448 is the constant current, therefore the gate-source voltage of PMOS transistor 448 is substantially equal to the gate-source voltage of the PMOS transistor 424. In other words, the voltage at node 442 is forced to be the difference between the voltage source 401 and the base-emitter junction voltage of the NPN transistor 404 (i.e., $V_{SS} - V_{BE404}$), thereby forcing the CTAT current to flow via the resistors 440.

However, the current flowing into the node 442 must be equal to the current flowing from the node 442. As described above, the constant current flows out, therefore the current flowing from the drain of the PMOS transistor 444 follows.

$$I_{444} = I_{442} - I_{440} = I_{CONST} - I_{CTAT} = I_{PTAT} \quad \text{[Equation 11]}$$

where $I_{444}$ is the current flowing from the PMOS transistor 444, $I_{442}$ is the current flowing from the node 442, and $I_{440}$ is the current flowing across resistor 440. Because the PTAT current is forced through the PMOS transistor 444, the voltage applied to the gate of the PMOS transistor 444 is forced to turn on the PMOS transistor 444 to allow the PTAT current to flow into the node 442.

As described above, to form the PTAT voltage, a PTAT voltage generator 340 is included. In the example of FIG. 4A, the PTAT voltage generator 340 is implemented by a PMOS transistor 452 that is matched with the PMOS transistor 444. Additionally, a resistor 454 may have a resistance substantially equal to the resistance of 406. Alternatively, the resistance of resistor 454 may be selected based on a ratio to generate a scaled PTAT voltage reference. The source of the PMOS transistor 452 is coupled to the voltage source 401 and the PMOS transistor 452 receives the output signal from the PTAT sensor 330 via its gate. The drain of the PMOS transistor 452 is coupled to ground 403 via the resistor 454.

The PTAT generator 340 operates by receiving the gate-source voltage of the PMOS transistor 444 via PMOS transistor 452, thereby mirroring the PTAT current. The PTAT current flows from the source of the PMOS transistor 452 to ground 403 across the resistor 454 and thereby produces the PTAT voltage. Therefore, the output from the PTAT voltage generator 340 is formed across the resistor 454.

In the example of FIG. 4A, the CTAT current and the PTAT current are generated in a single voltage loop and the transistors 402, 404 are self-biased. To start the example circuit 400, a large enough current is provided via a startup circuit (not shown) to start the circuit so that current flows into the nodes 410, 415. Initially, current does not flow via the transistors 402, 404, and the current flows only via the resistors 406, 408. The current flowing via resistors 406, 408 may be large enough to turn off the startup circuit, thereby preventing any current from flowing via transistors 402, 404. However, current must flow via transistors 402 and 404 to generate the bandgap reference in the example circuit 400.

Additionally, in the example of FIG. 4A, the PTAT current is formed via sensing the CTAT current and subtracting the CTAT current from the constant current, thereby generating the PTAT current. Persons having ordinary skill in the art will readily appreciate that generating the PTAT current by subtracting accurately reproduces the PTAT voltage, thereby avoiding any voltage mismatches due to intrinsic voltages by sensing the PTAT voltage with operational amplifiers (e.g., a 1 millivolt mismatch associated with an operation amplifier produces a 4% mismatch error when translated into an emitter current at room temperature). Additionally, in the example of FIG. 4A, an extra transistor is not needed to generate the PTAT current, thereby preventing any inaccuracies due to potential temperature differences in the example circuit 400.

Figure 1:
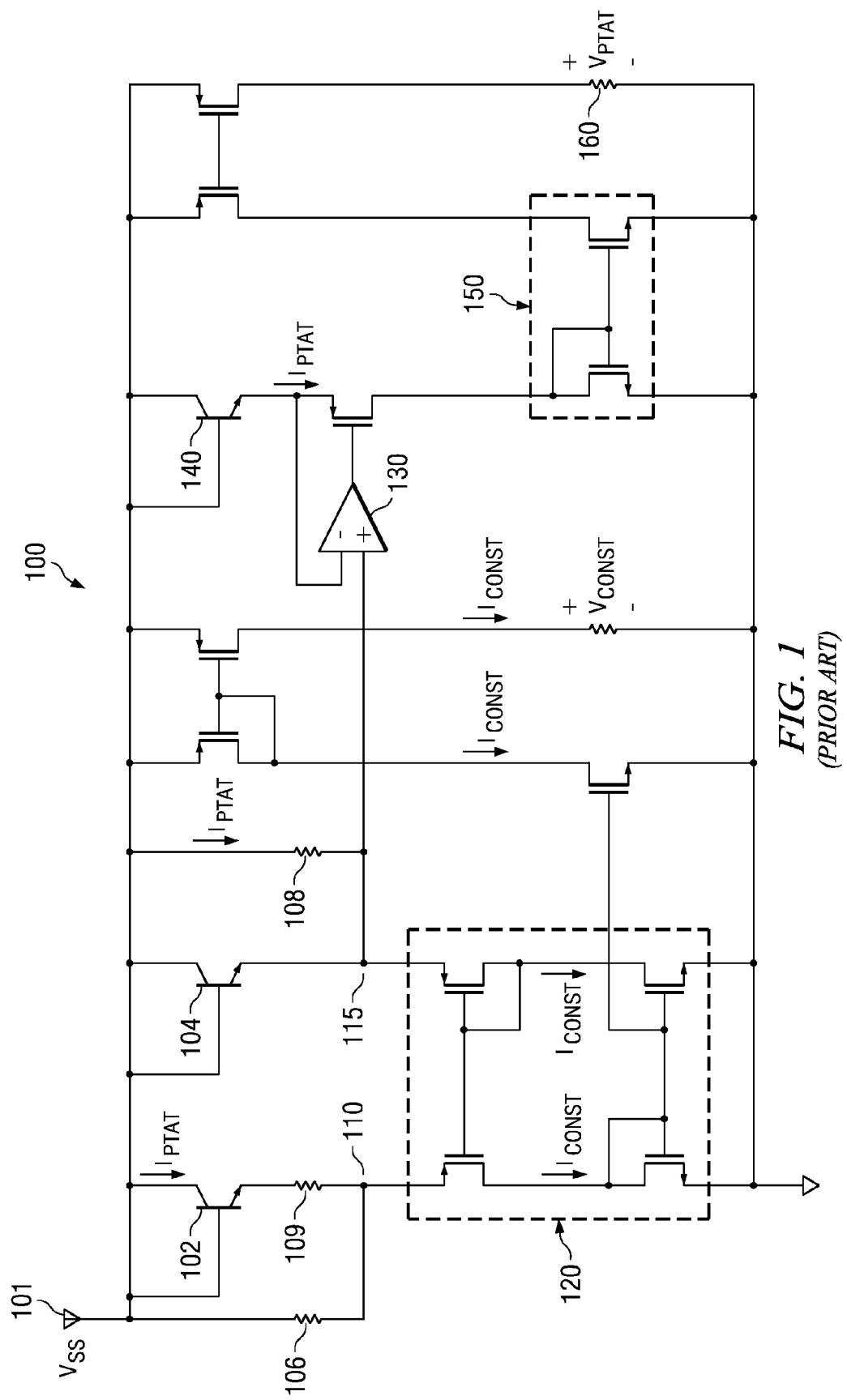
FIG. 1 is a schematic of a known bandgap reference circuit including a PTAT reference generator.
Figure 4B:
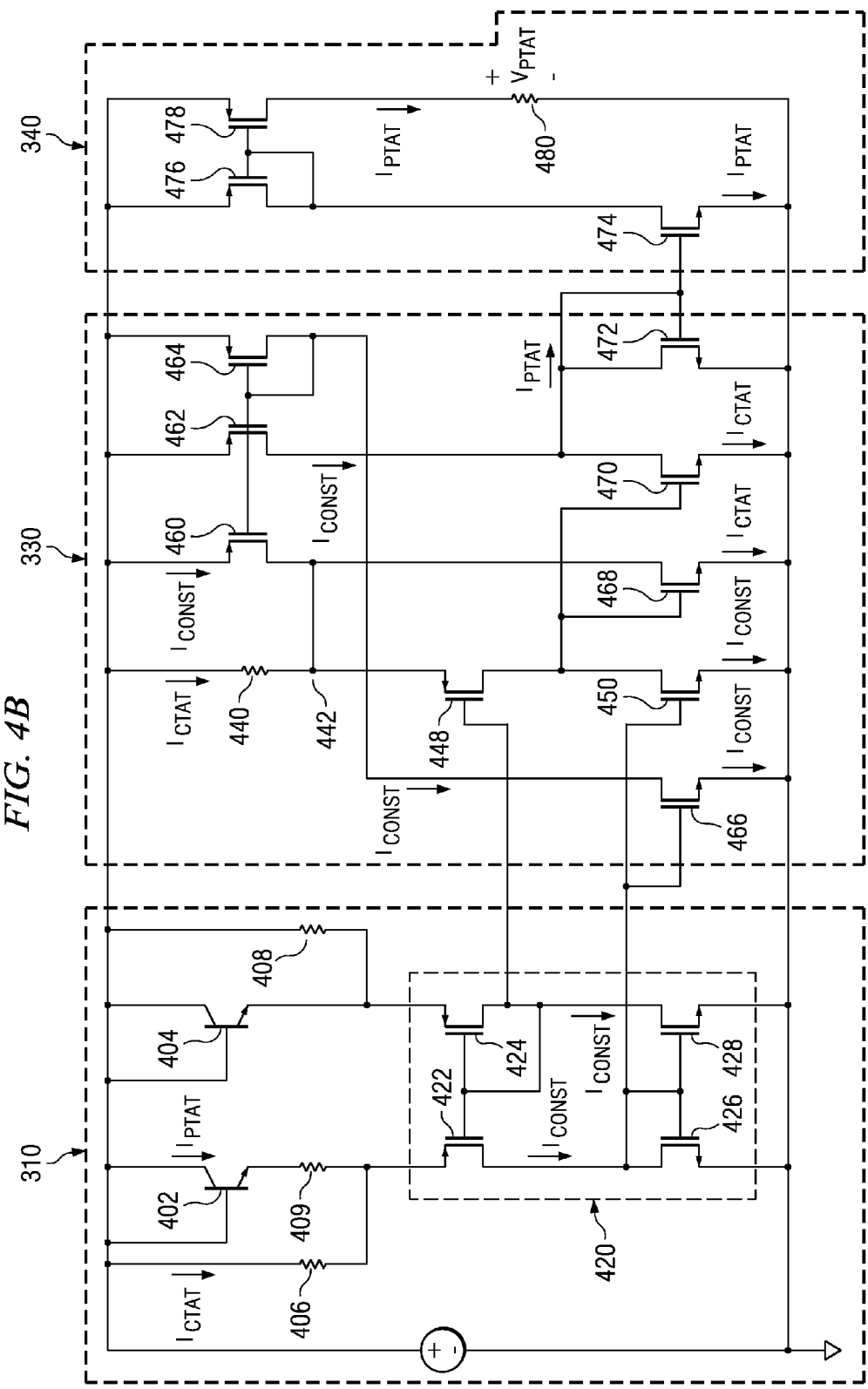

FIG. 4B is a schematic of another example circuit 401 that implements the example process 200 of FIG. 2. In the example of FIG. 1, the constant current generator 310 operates similarly as described above in conjunction with FIG. 4A. The constant voltage generator 320 is not included in the example of FIG. 4B, however, the constant voltage generator 320 described in conjunction with FIG. 4A may be implemented into the example circuit 401.

The PTAT sensor 330 of the example illustrated in FIG. 4B operates in a similar fashion as described in conjunction with FIG. 4A, however, the PTAT current is generated by subtracting the CTAT from the constant current. In the example of FIG. 4B, the PMOS device 448 mirrors the CTAT voltage at the node 442, thus drawing the CTAT current across resistor 440. An NMOS transistor 466 mirrors the constant current, which causes a PMOS transistor 464 to source the constant current to the NMOS transistor 466. The PMOS transistor 464 is coupled to a PMOS transistor 462 and another PMOS transistor. In the example of FIG. 4B, the PMOS transistor 460 causes the PMOS transistors 460, 462 to source the constant current.

The PMOS transistor 460 sources the constant current, however, the PMOS transistor 450 causes the constant current from PMOS transistor 460 to flow into the source of the PMOS transistor 448. As a result, the CTAT current provided via the resistor 440 flows into the NMOS transistor 468. In the example of FIG. 4B, because the current of the NMOS transistor 468 is the CTAT current, the draining of the NMOS transistor 450 is forced to apply a gate voltage to the NMOS transistor 468 that causes it to sink the CTAT current. An NMOS transistor 470 mirrors the current flowing into the NMOS transistor 468, and, as a result, sinks the CTAT current from the drain of the PMOS transistor 462. The difference between the current flowing from PMOS transistor 462 and the current flowing into the NMOS transistor 470 flows into the NMOS transistor 472. Thus, the CTAT current is subtracted from the constant current to generate the PTAT current. Thus, the NMOS transistor 472 sinks the PTAT current and the PMOS transistor 476 sources the PTAT current.

In the example of FIG. 4B, a PMOS transistor 478 of the PTAT voltage generator 340 is coupled with the PMOS transistor 476, thereby mirroring the PTAT current. The PTAT current flows across the resistor 480, thereby generating the PTAT voltage.

II. Alternative Bandgap Reference

Figure 5:
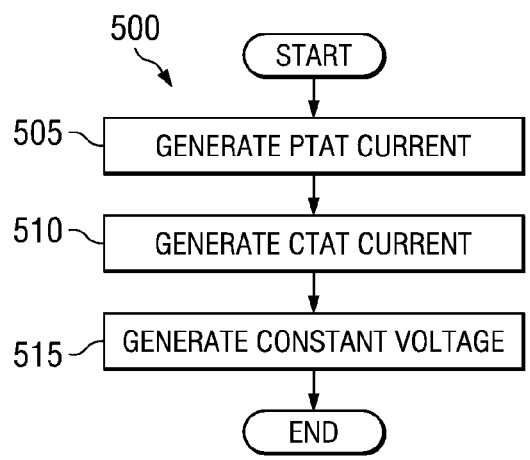
FIG. 5 is a flowchart of an alternate process to generate a bandgap reference.

Another method of generating a bandgap reference is illustrated in the example process 500 of FIG. 5. In the example of FIG. 5, the example process 500 begins by generating the PTAT current (block 505). After generating the PTAT current, the example process 500 generates the CTAT current (i.e., $I_{CTAT}$) (block 510). After generating the CTAT current, the example process 500 generates the constant current and the constant voltage (block 515). In some examples, the PTAT current and the CTAT current are summed to form the constant current.

Figure 6:
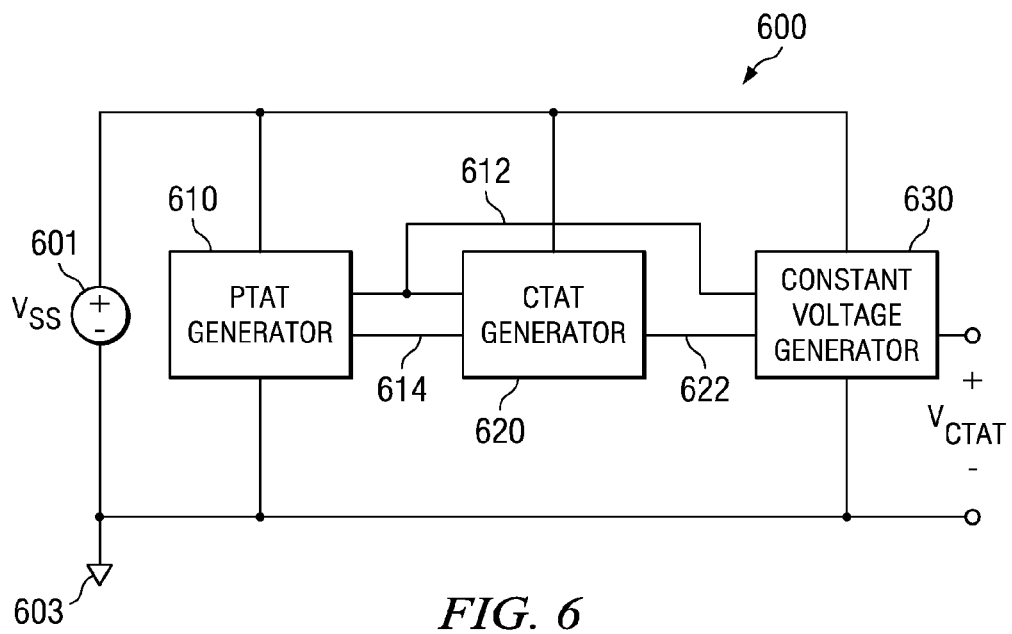
FIG. 6 is a block diagram of an example circuit to implement the example process of FIG. 5.

FIG. 6 illustrates a block diagram of an example circuit 600 to implement the example process of FIG. 5. A voltage source 601 and a ground 603 are coupled to a PTAT generator 610, a CTAT generator 620, and a constant voltage generator 630. The PTAT generator 610 outputs a first signal on line 612 to the CTAT generator 620 and the constant voltage generator 630. Additionally, the PTAT generator outputs a second signal on line 614 to the constant voltage generator 630 and the CTAT generator 620 outputs a first signal on line 622 to the constant voltage generator 630. In the example of FIG. 6, the constant current is produced by a first current generator to generate the PTAT current, which is added to the CTAT current that is generated by a second current generator. The summed result of the CTAT current and the PTAT current is the constant current.

Figure 7:
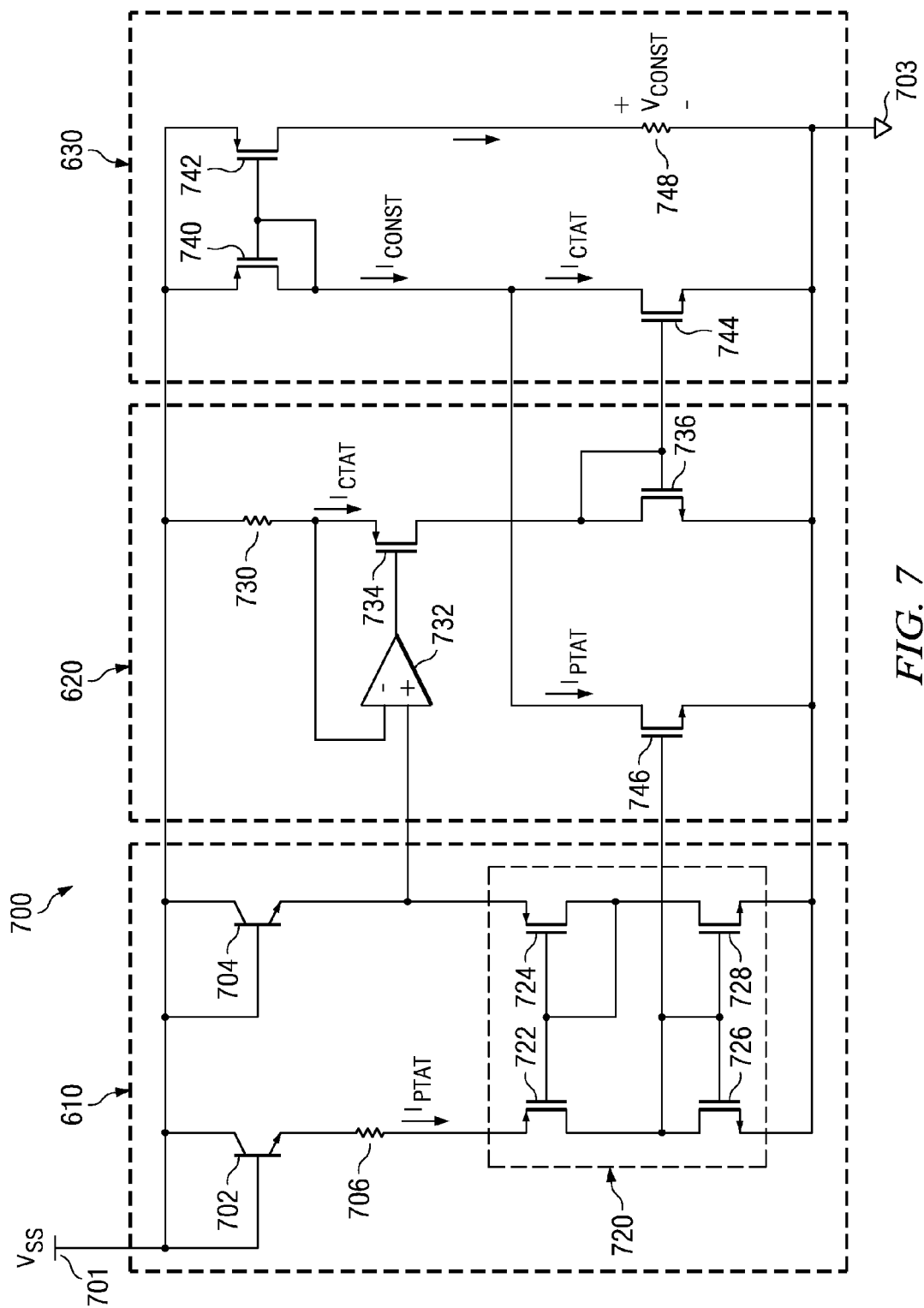
FIG. 7 is a schematic diagram of an example circuit to implement the example process of FIG. 5 and/or the block diagram of FIG. 6.

FIG. 7 is a schematic of an example circuit 700 that implements the example process 500 of FIG. 5 and/or the block diagram of FIG. 6. In the example of FIG. 7, similar reference numerals are used to denote similar portion or components as shown in FIG. 6. The PTAT generator 610 is implemented by a voltage source 701 coupled to an NPN transistor 702 and an NPN transistor 704. The NPN transistor 704 is selected to have a larger current density than the NPN transistor 702, thereby having a larger base-emitter voltage (i.e., $V_{BE}$) than the NPN transistor 702. The base and collector of the NPN transistors 702 and 704 are coupled to a voltage source 701, thereby causing both NPN transistors 702 and 704 to operate as a diode. The emitter of the NPN transistor 702 is coupled to a first input of a control circuit 720 via a resistor 709 and the emitter of the NPN transistor 704 is coupled to a second input of the control circuit 720.

The control circuit 720 is formed by a PMOS transistor 722, a PMOS transistor 724, an NMOS transistor 726, and an NMOS transistor 728. In the example of FIG. 7, the control circuit 720 receives the first input via the PMOS transistor 722 and also receives the second input via the PMOS transistor 724. The gate of the PMOS transistor 722 is coupled to both the gate and the drain of the PMOS transistor 724 and the drain of the NMOS transistor 728. The drain of the PMOS transistor 722 is coupled to both the gate and the drain of the NMOS transistor 726 and the gate of the NMOS transistor 728. The sources of both NMOS transistors 726 and 728 are coupled to ground 703.

As described in detail above, the control circuit 720 forces the voltages and currents at the inputs of the control circuit 720 to be equal or substantially equal. In the example of FIG. 7, the voltage applied to the second input via the NPN transistor 704 is based on the base-emitter voltage of the NPN transistor 704 (i.e, $V_{SS}-V_{BE704}$). The current flowing via the NPN transistor 702 is controlled by the NPN transistors 702 and 704 and the resistor 706. A voltage loop equation to determine the current via the NPN transistor 704 is shown in equation 11.

$$V_{BE704}+V_{GS724}-V_{GS722}-I_{702}R_{706}-V_{BE702}=0 \quad \text{[Equation 12]}$$

where $V_{BE702}$ and $V_{BE704}$ are the respective base-emitter voltages of the NPN transistors 704 and 702, $V_{GS722}$ and $V_{GS724}$ are the respective gate-source voltage of the PMOS transistors 722 and 724, $R_{706}$ is the resistance of resistor 706, and $I_{702}$ is the current flowing from the NPN transistor 702. Based on the foregoing, the current flowing across the NPN transistors 702 and 704 is described by the equation 13.

$$I_{702} = \frac{V_{BE704} - V_{BE702}}{R_{706}} = \frac{\Delta V_{BE}}{R_{706}} = I_{PTAT} \quad \text{[Equation 13]}$$

where $V_{BE702}$ and $V_{BE704}$ are the respective base-emitter voltages of the NPN transistors 702 and 704, and $R_{706}$ is the resistance value of the resistor 706. An output of the PTAT generator 610 is formed at the emitter of the NPN transistor 704.

As described above, the PTAT current of the PTAT generator 610 is generated by the NPN transistors 702 and 704. During startup of the example circuit 700, there is no alternate path that current can take to bypass the NPN transistors 702 and 704, thereby ensuring that current will flow via the NPN transistors 702 and 704. Because current only flows via NPN transistors 702 and 704, a startup circuit for the example circuit 700 is simple to implement.

In the example of FIG. 7, to generate the CTAT current, the CTAT generator 620 senses the base-emitter voltage drop across the NPN transistor 704. To sense the base-emitter voltage, a negative input of operational amplifier 732 is coupled to the voltage source 701 via a resistor 730. The non-inverting terminal of the operational amplifier 732 receives the first signal provided via the PTAT generator 610. The output of the operational amplifier 732 is coupled to a gate of a PMOS transistor 734 and the inverting terminal of the operational amplifier 732 is coupled to the source of the PMOS transistor 734. The source of the PMOS transistor 734 is coupled to the gate and the drain of an NMOS transistor 736. The source of the NMOS transistor 736 is coupled to ground 703 and its gate forms the output of the CTAT generator 620.

As described above, the non-inverting terminal of the operational amplifier 732 is coupled to the output of the PTAT generator 610. Persons of ordinary skill in the art will readily appreciate that by applying a voltage to the non-inverting terminal of the operational amplifier 732, the inverting terminal of the operational amplifier 732 is forced to have the same voltage. Therefore, the voltage and cross the resistor 730 is fixed and the current flowing through resistor 730 is shown in equation 14

$$I_{730} = \frac{V_{BE704}}{R_{730}} = I_{CTAT} \quad \text{[Equation 14]}$$

where $I_{730}$ is the current flowing through the resistor 730, $V_{BE704}$ is the base-emitter voltage drop across the NPN transistor 704, and $R_{730}$ is the resistance of resistor 730.

In the operation of the CTAT generator 620, persons having ordinary skill in the art will readily appreciate that the current does not flow into the inverting terminal of the operational amplifier 732, thereby forcing the operational amplifier 732 to set the gate-source voltage of the PMOS transistor 734 to draw the CTAT current. The CTAT current flows into the drain of the NMOS transistor 736 and no current flows into the gate of the NMOS transistor 736. The gate-source voltage of the NMOS transistor 736 is thereby forced to allow the CTAT current to flow into ground 703. In the example of FIG. 7, the gate of the NMOS transistor 736 also outputs a signal to reproduce the CTAT current.

In the example of FIG. 7, the constant voltage generator 630 is implemented by a PMOS transistor 740 and a PMOS transistor 742. The sources of the PMOS transistors 740 and 742 are coupled to the voltage source 701. The gates of the PMOS transistors 740 and 742 are coupled to the drain of the PMOS transistor 740. Additionally, the drain of the PMOS transistor 740 is coupled to the drain of an NMOS transistor 744 and the drain of an NMOS transistor 746. The gate of the NMOS transistor 744 receives the output signal from the CTAT generator 620 and the gate of the NMOS transistor 746 receives the first output signal from the PTAT generator 610. The sources of both NMOS transistors 744 and 746 are coupled to ground 703. Additionally, the drain of the PMOS transistor 742 is coupled to ground 703 via a resistor 748. In the example of FIG. 7, the PMOS transistors 740 and 742 are matched and the NMOS transistors 744 and 746 are configured to match the NMOS transistor 726.

In the operation of the constant voltage generator 630, the gate-source voltage of the NMOS transistor 744 is configured to have a gate-source voltage equal or substantially equal to the NMOS transistor 736, thereby forcing the NMOS transistor 744 to mirror the CTAT current. However, the NMOS transistor 746 is configured to have a gate-source voltage equal or substantially equal to the gate-source voltage of the NMOS transistor 726, thereby mirroring the PTAT current.

Persons of ordinary skill in the art will readily appreciate the current flowing into the drain of the PMOS transistor 740 must be equal or substantially equal to the current flowing from it. The NMOS transistors 744 and 746 sink current from the drain of the PMOS transistor 740, thereby forcing the gate-source voltage of the PMOS transistor 740 so that it sources both of the currents. As a result, the current sourced by PMOS transistor 740 is the sum of CTAT current and the PTAT current, thereby generating the constant current. To source the constant current, the gate-source voltage of the PMOS transistor 740 is forced based on the constant current. The PMOS transistor 742 receives the same gate-source voltage and mirrors the constant current, which flows across the resistor 748 into ground 703. Therefore, the voltage across the resistor 748 is the constant voltage and the output of the constant voltage generator 630 is formed across the resistor 748.

Figure 8:
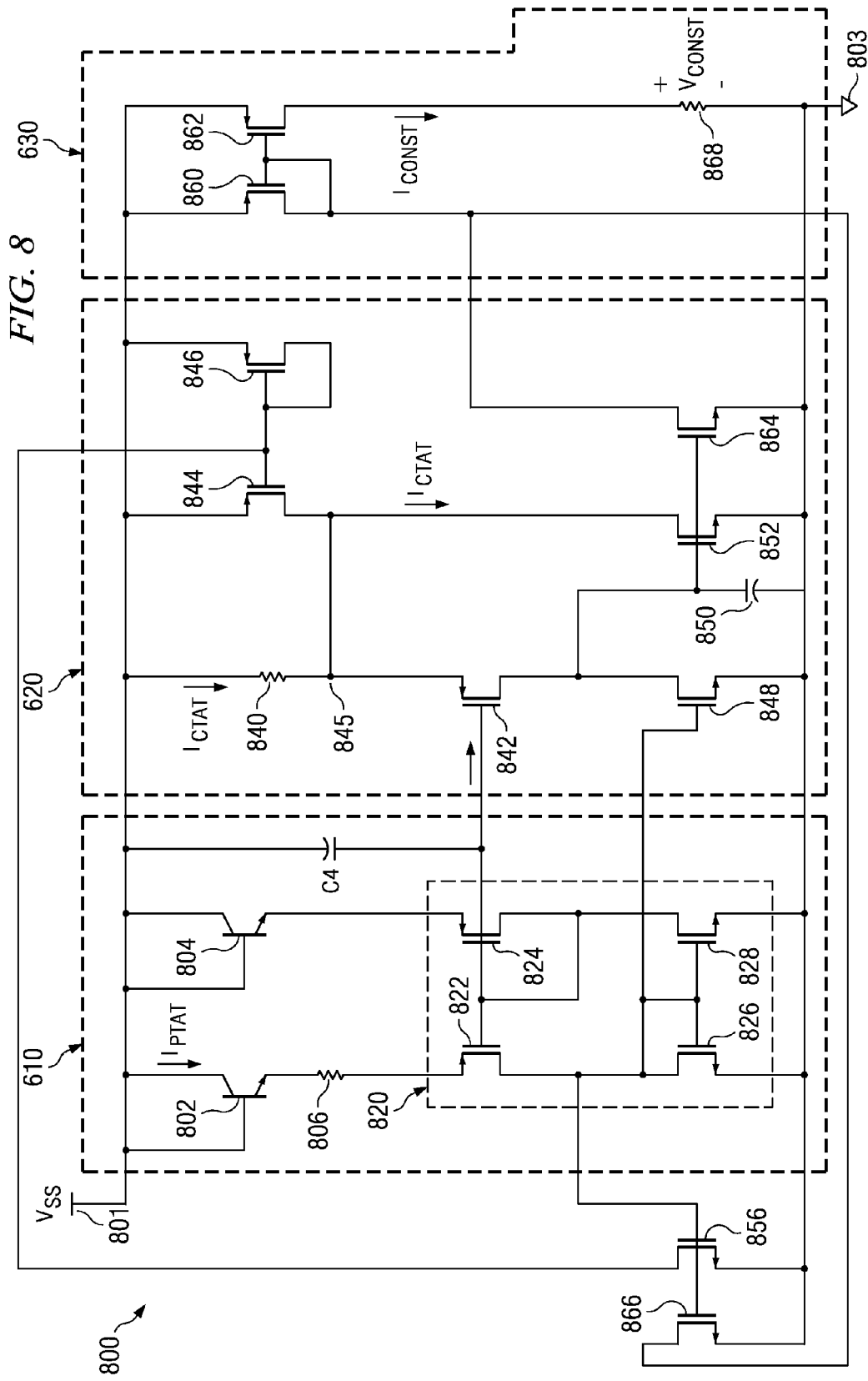
FIG. 8 is another schematic diagram of an example circuit to implement the example process of FIG. 5 and/or the block diagram of FIG. 6.

FIG. 8 is a schematic diagram of another example circuit 800 that implements the example process 500 of FIG. 5. In the example of FIG. 8, similar reference numerals are used to denote similar portion or components as shown in FIG. 6. The PTAT generator 610 is implemented by a voltage source 801 coupled to an NPN transistor 802 and an NPN transistor 804. As described above, the NPN transistor 804 is selected to have a larger current density than the NPN transistor 802, thereby causing the NPN transistor 804 to have a larger base-emitter voltage. The base and collector of the NPN transistors 802 and 804 are coupled to the voltage source 801. The emitter of the NPN transistor 802 is coupled to a first input of a control circuit 820 via a resistor 806 and the base of the NPN transistor 804 is coupled to a second input of the control circuit 820.

The control circuit 820 is formed by a PMOS transistor 822, a PMOS transistor 824, an NMOS transistor 826, and an NMOS transistor 828. In the example of FIG. 8, the control circuit 820 receives the first input via the PMOS transistor 822 and receives the second input via the PMOS transistor 824. The gate of the PMOS transistor 822 is coupled to both the gate and the drain of the PMOS transistor 824 and the drain of the NMOS transistor 828. The drain of the PMOS transistor 822 is coupled to both the gate and the drain of the NMOS transistor 826 and the gate of the NMOS transistor 828. The sources of the NMOS transistors 826 and 828 are coupled to ground 803.

As described above, the NPN transistors 802 and 804 are configured to have different current densities, thereby having different base-emitter junction voltages. The difference in the base-emitter voltages must therefore be the voltage drop across the resistor 806 due to the control circuit 820, which as described above, forces the voltages and currents at nodes 810 and 815 to be substantially equal. Therefore, the current flowing into the control circuit 820 is the PTAT current and the voltage at the inputs of the control circuit 820 is the difference between the voltage of the voltage source 801 and the base-emitter junction voltage of the NPN transistor 804.

In the example of FIG. 8, the CTAT generator 620 is implemented a resistor 840, a PMOS transistor 842, a PMOS transistor 844, a PMOS transistor 846, an NMOS transistor 848, a capacitor 850, an NMOS transistor 852, and an NMOS transistor 856. The PMOS transistors 842, 844, and 846 are configured to match the PMOS transistor 824. Similarly, the NMOS transistors 848, 852, and 856 match the NMOS transistor 826. The resistor 840 may be selected to scale the voltage drop across the resistor 840 based on the resistance of resistor 806. By scaling the ratio correctly, the positive temperature coefficient of the PTAT current and the negative temperature coefficient of the CTAT current cancel each other out, thereby allowing the CTAT and PTAT currents to be combined to produce a temperature independent reference.

The source of the PMOS transistor 842 is coupled to the voltage source 801 via the resistor 840, the drain of the PMOS transistor 844, and the drain of the NMOS transistor 852. The gate of the PMOS transistor 842 receives the second output signal of the PTAT generator 610. The drain of the PMOS transistor 842 is coupled to the drain of the NMOS transistor 848 and the gate of the NMOS transistor 852. Additionally, the drain of the PMOS transistor 842 is coupled to ground 803 via the capacitor 850. The drain of the NMOS transistor 842 also forms the output of the CTAT generator 620.

The gate of the NMOS transistor 848 receives the first output signal of the PTAT generator 610 and its source is coupled to ground 803. The source of the NMOS transistor 852 is also coupled to ground 803. The sources of both PMOS transistors 844 and 846 are coupled to the voltage source 801. The gates of the PMOS transistors 844 and 846 and the source of the PMOS transistor 846 are all coupled to the drain of the NMOS transistor 856. The gate of the NMOS transistor 856 also receives the first output signal of the PTAT generator 610.

In the operation of the CTAT generator 620, the gate-source voltage applied to the NMOS transistor 848 is equal or substantially equal to the gate-source voltage of the NMOS transistor 826, thereby setting the current drawn via NMOS transistor 848 to be equal or substantially equal to the current drawn via the NMOS transistor 826. In other words, the NMOS transistor 848 mirrors the PTAT current. Persons having ordinary skill in the art will readily appreciate that no current flows to ground 803 via the capacitor 850 and no current flows into the gate of the NMOS transistor 852. In the example of FIG. 8, the capacitor 850 may be included to provide compensation, thereby stabilizing the example circuit 800.

The current flowing into the NMOS transistor 842 must be substantially equal to the current flowing out (i.e., the PTAT current). However, the gate of the NMOS transistor 842 receives the second output signal of the PTAT generator 610, thereby forcing the voltage at the source of the PMOS transistor 842 to be the difference between the voltage source and the base-emitter voltage of the NPN transistor 804 (i.e., $V_{SS}-V_{BE804}$). Because the voltage at the source of the PMOS transistor 842 is forced based on the base-emitter junction voltage of the NPN transistor 804 (i.e., the CTAT voltage), the current across the resistor 840 is forced to be the CTAT current (i.e., $I_{CTAT}$). The NMOS transistor 856 also receives the first output of the PTAT generator 610, thereby mirroring the PTAT current of the NMOS transistor 826. The PMOS transistor 846 provides the PTAT current for the NMOS transistor 856 and the PMOS transistor 844 mirrors the current of the PMOS transistor 846.

The current provided via the PMOS transistor 846 flows into a node that is coupled to the source of the PMOS transistor 842 and the drain of the NMOS transistor 852. The CTAT current and the PTAT current therefore flow into the node and persons having ordinary skill in the art will readily appreciate that the current flowing into the node must be equal or substantially equal to the current flowing out of the node. As described above, the PTAT current is forced to flow into the source of the PMOS transistor 842, thereby forcing the CTAT current to flow into the drain of the NMOS transistor 852. The gate-source voltage of the NMOS transistor 852 is therefore set by the CTAT current to allow the CTAT current to flow into ground 803. The gate of the NMOS transistor 852 also outputs a signal from the CTAT generator 620 for the purpose of reproducing the CTAT current.

In the example of FIG. 8, the constant voltage generator 630 is implemented by a PMOS transistor 860, a PMOS transistor 862, an NMOS transistor 864, an NMOS transistor 866, and a resistor 868. The sources of the PMOS transistors 860 and 862 are coupled to the voltage source 801. The gate and drain of the PMOS transistor 860 and the gate of the PMOS transistor 862 are coupled to the drains of the NMOS transistors 864 and 866. The NMOS transistor 864 receives the output signal from the CTAT generator 620 via its gate and the NMOS transistor 866 receives the first output signal of the PTAT generator 610 via its gate. The sources of both NMOS transistors 866 and 864 are coupled to ground 803. The source of the PMOS transistor 862 is coupled to ground 801 via the resistor 868.

In the example of FIG. 8, the PMOS transistors 860 and 862 are matched. Optionally, the PMOS transistors 860 and 862 may match the PMOS transistor 824. Similarly, the NMOS transistors 864 and 866 are configured to match the NMOS transistor 826.

Because the NMOS transistor 864 receives the output signal of the CTAT generator 620, its gate-source voltage is set to be equal or substantially equal to the gate-source of the NMOS transistor 848, thereby mirroring the CTAT current. Similarly, the NMOS transistor 866 receives the first output signal of the PTAT generator 610 and its gate-source voltage is set to be equal or substantially equal to the gate-source of the NMOS transistor 826, thereby mirroring the PTAT current.

Persons having ordinary skill in the art will readily appreciate the current flowing from the drain of the PMOS transistor 860 is equal or substantially equal to the current flowing into the drains of the NMOS transistors 864 and 866. Therefore, the current flowing from the drain of the PMOS transistor 860 is the sum of the PTAT current and CTAT reference current (i.e., the constant current). The gate-source voltage of the PMOS transistors 860 and 862 are therefore set to allow the constant current to flow from the drains of the PMOS transistors 860 and 862. The constant current therefore flows across resistor 868 to generate a constant voltage. The output of the constant voltage generator 630 is thereby formed across the resistor 868.

In the described examples, the example circuits implement a bandgap reference by adding and subtracting currents. Persons of ordinary skill in the art will readily appreciate that active devices (i.e., NPN transistors, PMOS transistors, NMOS transistors, etc.) may be configured in any number of ways to subtract currents and generate a bandgap reference. For example, the NMOS and PMOS transistors may be implemented by NPN or PNP transistors. In other examples, the NPN transistors may be implemented with diodes (i.e., PN junctions).

III. Temperature Detector Circuit

Figure 9:
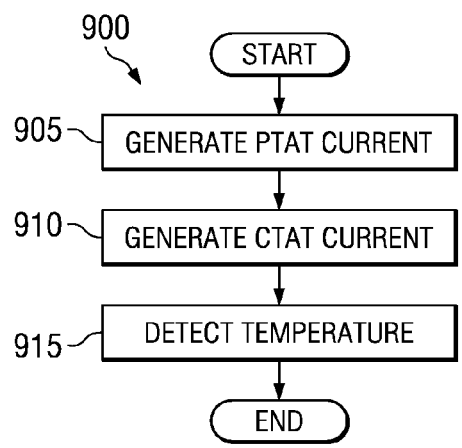
FIG. 9 is flowchart of an example process to sense the temperature of a circuit.

In addition, the described examples may be used to implement a fully-isolated NPN temperature detector. In a fully-isolated NPN-based temperature detector, the only nodes that touch the substrate are the solid nodes (e.g., ground, voltage source, etc.). FIG. 9 illustrates an example process 900 to implement such a temperature sensor. Initially, the example process 900 generates the PTAT current (block 905). After forming the PTAT current, the example process 900 generates the CTAT current. After forming the two currents, the CTAT current and PTAT currents are compared to determine the temperature. For example, the example process may implement at least one temperature detector to detect if the temperature exceeds at least one predetermined temperature.

Figure 10:
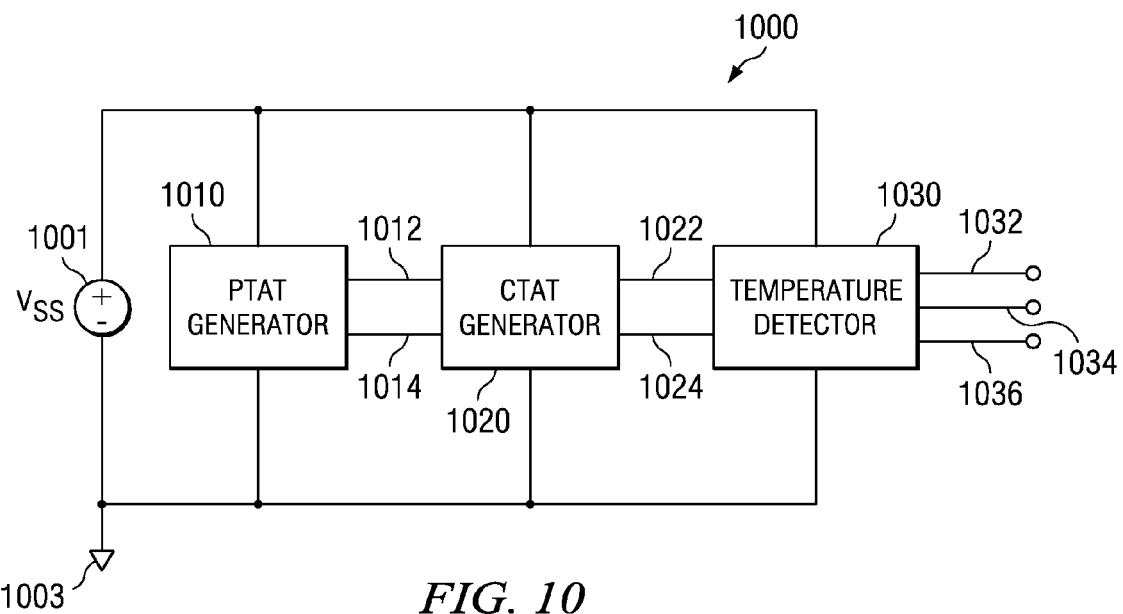
FIG. 10 is a block diagram of an example circuit to implement the example process of FIG. 9.

FIG. 10 illustrates a block diagram of an example circuit 1000 that may be used to implement the example process 900. In the example of FIG. 10, the voltage source 1001 and a ground are coupled to a PTAT generator 1010, a CTAT current generator 1020, and a temperature detector 1030. The PTAT generator 1010 generates the PTAT current and outputs a first signal on line 1012 and a second signal on line 1014 that are both received by the CTAT generator 1020. The CTAT generator 1020 generates the CTAT current and outputs a first signal on line 1022 and a second signal on line 1024 that are both received by the temperature detector 1030. In the example of FIG. 10, the temperature detector 1030 outputs three signals on lines 1032, 1034, and 1036, respectively, that are indicative of the temperature of the example circuit 1000 (e.g., hot, warm, cold).

In some examples, each output (e.g., lines 1032, 1034, and 1036) of the temperature detector 1030 detects if the example circuit 1000 exceeds a predetermined temperature associated with the output (e.g., if line 1032 exceeds 100° C., if line 1034 exceeds 150° C., etc.). If the example circuit 1000 exceeds the predetermined temperature of the respective output, the temperature detector 1030 conveys a signal (e.g., a high voltage, etc.) indicative of a high temperature (i.e., the temperature is greater than the predetermined temperature). Similarly, if the example circuit 1000 does not exceed the predetermined temperature associated with the output, the temperature detector 1030 conveys a signal (e.g., a low voltage, etc.) indicative of a low temperature (i.e., the temperature is lower than the predetermined threshold).

Figure 11:
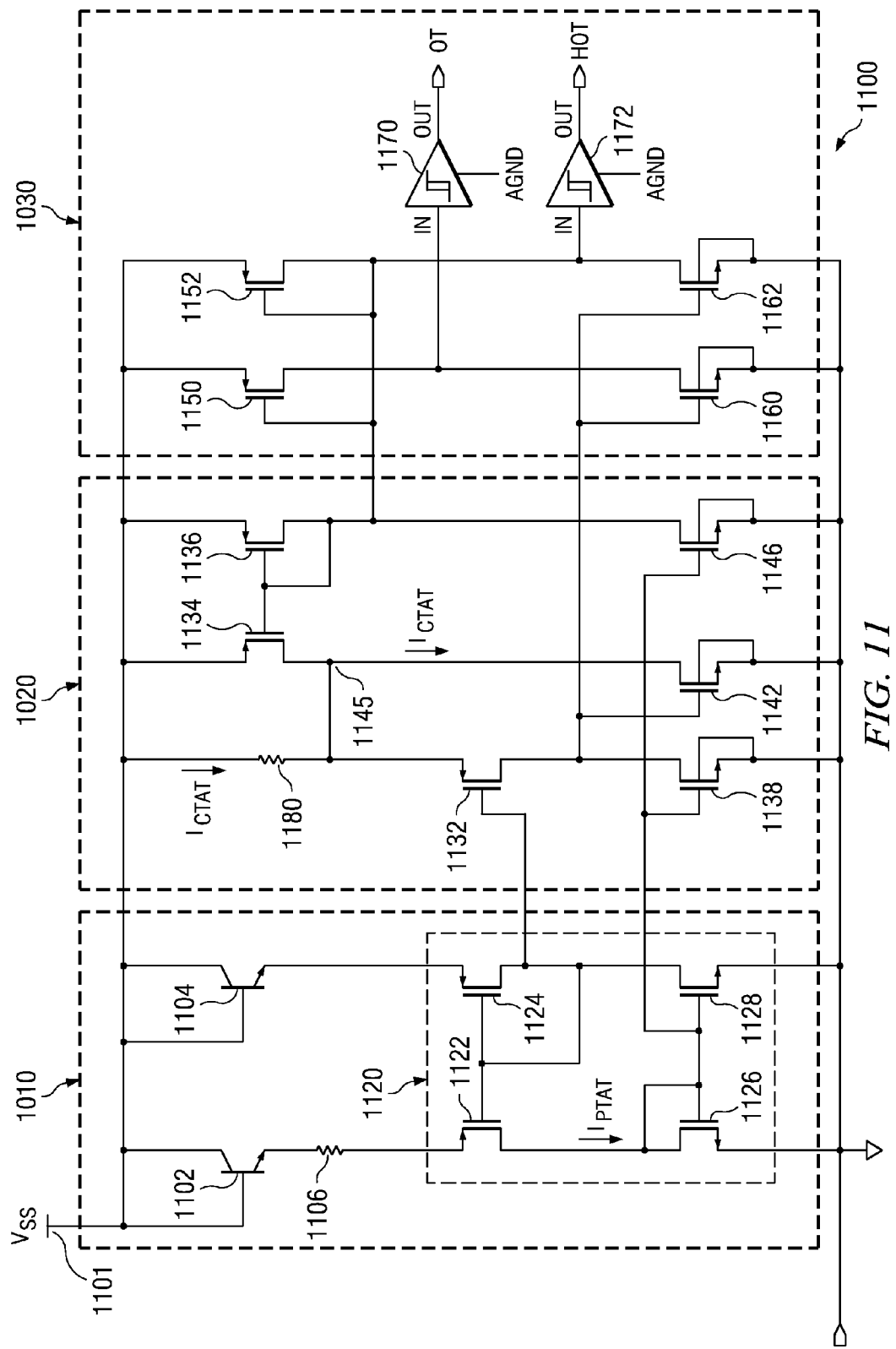
FIG. 11 is schematic diagram of an example circuit to implement the example process of FIG. 9 and/or the block diagram of FIG. 10.

FIG. 11 is a schematic diagram representing an example circuit 1000 to implement the example process 900 of FIG. 9. In the example of FIG. 11, similar reference numerals are used to denote similar portion or components as shown in FIG. 10. The PTAT generator 1010 is implemented by a voltage source 1001 coupled to an NPN transistor 1102 having a first current density and an NPN transistor 1104 having a second current density. The NPN transistor 1104 is selected to have a larger current density than the NPN transistor 1102, thereby requiring a larger base-emitter voltage to turn on the NPN transistor 1104. In the example of FIG. 11, the base and collector of the NPN transistors 1102 and 1004 are coupled to the voltage source 1101. The emitter of the NPN transistor 1102 is coupled to a first input of a control circuit 1120 via resistor 1106 and the emitter of the NPN transistor 1104 is coupled to a second input of the control circuit 1120.

The control circuit 1120 is formed by a PMOS transistor 1122, a PMOS transistor 1124, an NMOS transistor 1126, and an NMOS transistor 1128. In the example of FIG. 11, the control circuit 1120 receives the first input via the PMOS transistor 1122 and also receives the second input via the PMOS transistor 1124. The gate of the PMOS transistor 1122 is coupled to the gate and the drain of the PMOS transistor 1124 and the drain of the NMOS transistor 1128. The drain of the PMOS transistor 1122 is coupled to the gate and the drain of the NMOS transistor 1126 and the gate of the NMOS transistor 1128. The sources of the NMOS transistors 1126 and 1128 are both coupled to ground 1103.

As described above, the NPN transistors 1102 and 1104 are configured to have different current densities, thereby having different base-emitter voltages. Therefore, the difference in the base-emitter voltages of the NPN transistors 1102 and 1104 is equal to the voltage drop across the resistor 1106, thereby forming the PTAT current across the resistor 1106. The voltage at the inputs of the control circuit 1120 is the voltage of the voltage source 1101 reduced by the base-emitter junction voltage of the NPN transistor 1104. The gate of the PMOS transistor 1124 outputs a first signal and the gate of the NMOS transistor 1126 outputs a second signal.

In the example of FIG. 11, the CTAT generator 1120 is implemented by a resistor 1130, a PMOS transistor 1132, a PMOS transistor 1134, a PMOS transistor 1136, an NMOS transistor 1138, an NMOS transistor 1142, and an NMOS transistor 1146. The PMOS transistors 1132, 1134, and 1136 are configured to match the PMOS transistor 1124. Similarly, the NMOS transistors 1138, 1142, and 1146 are configured to match the NMOS transistor 1126.

The source of the PMOS transistor 1132 is coupled to the voltage source 1101 via the resistor 1130, the drain of the PMOS transistor 1134, and the drain of the NMOS transistor 1142. The gate of the PMOS transistor 1132 receives the second output signal of the PTAT generator 1110. Additionally, the drain of the PMOS transistor 1132 is coupled to the drain of the NMOS transistors 1138 and 1142 and the gate of the NMOS transistor 1142. The gate of the NMOS transistor 1142 also outputs a signal from the CTAT generator 1020.

The gate of the NMOS transistor 1138 receives the first output signal of the PTAT generator 1110 and its source is coupled to ground 1103. The source of the NMOS transistor 1146 is also coupled to ground 1103. The sources of both PMOS transistors 1134 and 1136 are coupled to the voltage source 1101. The gates of the PMOS transistors 1134 and 1136 and the source of the PMOS transistor 1136 are all coupled to the drain of the NMOS transistor 1146. The gate of the NMOS transistor 1146 also receives the first output signal of the PTAT generator 1110.

In the operation of the CTAT generator 1120, the gate-source voltage applied to the NMOS transistor 1138 is equal or substantially equal to the gate-voltage of the NMOS transistor 1126, thereby setting the current drawn via NMOS transistor 1138 to be equal or substantially equal to the current drawn via the NMOS transistor 1126 (i.e., the PTAT current). Persons of ordinary skill in the art will readily appreciate that no current flows into the gate of the NMOS transistor 1142.

The current flowing into the NMOS transistor 1132 must be the current flowing out (i.e., the PTAT current). However, the gate of the NMOS transistor 1132 receives the second output signal of the PTAT generator, thereby forcing the voltage at the source of the PMOS transistor 1132 to be the difference between the voltage source and the base-emitter voltage of the NPN transistor 1104 (i.e., $V_{SS}-V_{BE1104}$). Because the voltage at the source of the PMOS transistor 1132 is forced, the current across the resistor 1130 is the CTAT voltage of the NPN transistor 1104 divided by the resistance of the resistor 1130 (i.e., the CTAT current). The NMOS transistor 1146 also receives the first output of the PTAT generator 1010, thereby forcing its drain-source current to be the PTAT current. The PMOS transistor 1136 sources the current for the NMOS transistor 1146, thereby forcing the gate-source voltage to allow the PMOS transistor to source the PTAT current. The PMOS transistor 1144 mirrors the PTAT current of the PMOS transistor 1144, which flows into a node 1145 that is coupled to the source of the PMOS transistor 1132 and the drain of the NMOS transistor 11142.

Persons having ordinary skill in the art will readily appreciate that the current flowing into the node 1135 is substantially equal to the current flowing out of the node 1135. As described above, the PTAT current and the CTAT current flow into the node 1135, but the PMOS transistor 1132 sinks the PTAT current from the node 1135. As a result, the CTAT current flows into the drain of the NMOS transistor 1142 via the node 845. The gate voltage of the NMOS transistor 1142 is therefore forced to allow the CTAT current to flow into ground 1103. The gate of the NMOS transistor 1142 therefore forms a first output signal of the CTAT generator 1120 for the purpose of reproducing the CTAT current. Additionally, the gate of the PMOS transistor 1134 forms a second output signal for the purpose of reproducing the PTAT current.

In the example of FIG. 11, the temperature detector 1130 is implemented by a PMOS transistor 1150 and an NMOS transistor 1160. Additionally, the example temperature detector 1130 may include a Schmitt trigger 1170. Persons having ordinary skill in the art will readily appreciate that the Schmitt trigger provides noise immunity to the outputs of the example circuit 1100, thereby preventing false detections due to noise.

The NMOS transistor 1160 is configured to match the NMOS transistor 1126 and the PMOS transistor 1150 is configured to match the PMOS transistors 1122.

In the example of FIG. 11, the source of the PMOS transistor 1150 is coupled to the voltage source 1101. The source of the NMOS transistor 1160 is coupled to ground 1103. The drain of the PMOS transistor 1150 is coupled to the drain of the NMOS transistor 1160 and the input of the Schmitt trigger 1170. In the example of FIG. 11, the Schmitt trigger 1170 forms the output of the example circuit 1100.

As described above, the NMOS transistor 1160 receives the first output signal from the CTAT generator 1030 via its gate. The gate-source voltage of the NMOS transistors 1160 is therefore configured to sink up to the drain-source current of the NMOS transistor 1142 (i.e., the CTAT current). At the same time, the PMOS transistor 1150 receives the second output signal of the CTAT generator 1120 (i.e., the gate-source voltage of the PMOS transistor 1136). The PMOS transistor 1150 has the same gate-source voltage as the PMOS transistor 1136, thereby forcing the PMOS transistor 1150 to source the PTAT current.

In the example of FIG. 11, the input of the Schmitt trigger 1170 is a high impedance node and the PMOS transistor 1150 is configured to source current to the NMOS transistor 1160. At the same time, the NMOS transistor 1160 is configured to sink the CTAT current. However, if the current the NMOS transistor 1160 is configured to sink is greater than the current the PMOS transistors 1150 is configured to source, the result will be that the voltage on the shared drains will be close to the ground voltage since that is the voltage at which equilibrium will be reached. On the other hand, if the PMOS transistor 1150 is configured to source a larger current than the NMOS transistor 1160 is configured to sink, the result will be that the voltage on the shared drains will be close to the supply voltage (e.g., $V_{SS}$) since that is the voltage at which equilibrium will be reached. As a result, the temperature detector 1030 compares the currents and outputs a low when the temperature does not exceed a threshold. When the temperature exceeds the threshold, the temperature detector 1030 outputs a high.

In the example of FIG. 11, the example circuit 1100 is configured to detect two temperatures. However, the example circuit 1100 may be configured to detect any number of temperatures. For example by implementing a PMOS transistor 1152, an NMOS transistor 1162, and a Schmitt trigger 1164, a second temperature may be detected. In such an example, the PMOS transistor 1152 may be configured to source a different current (e.g., by having a different gate width-to-length ratio) than the PMOS transistor 1150, thereby causing the Schmitt trigger 1172 to output a high voltage at a second temperature.

Figure 12:
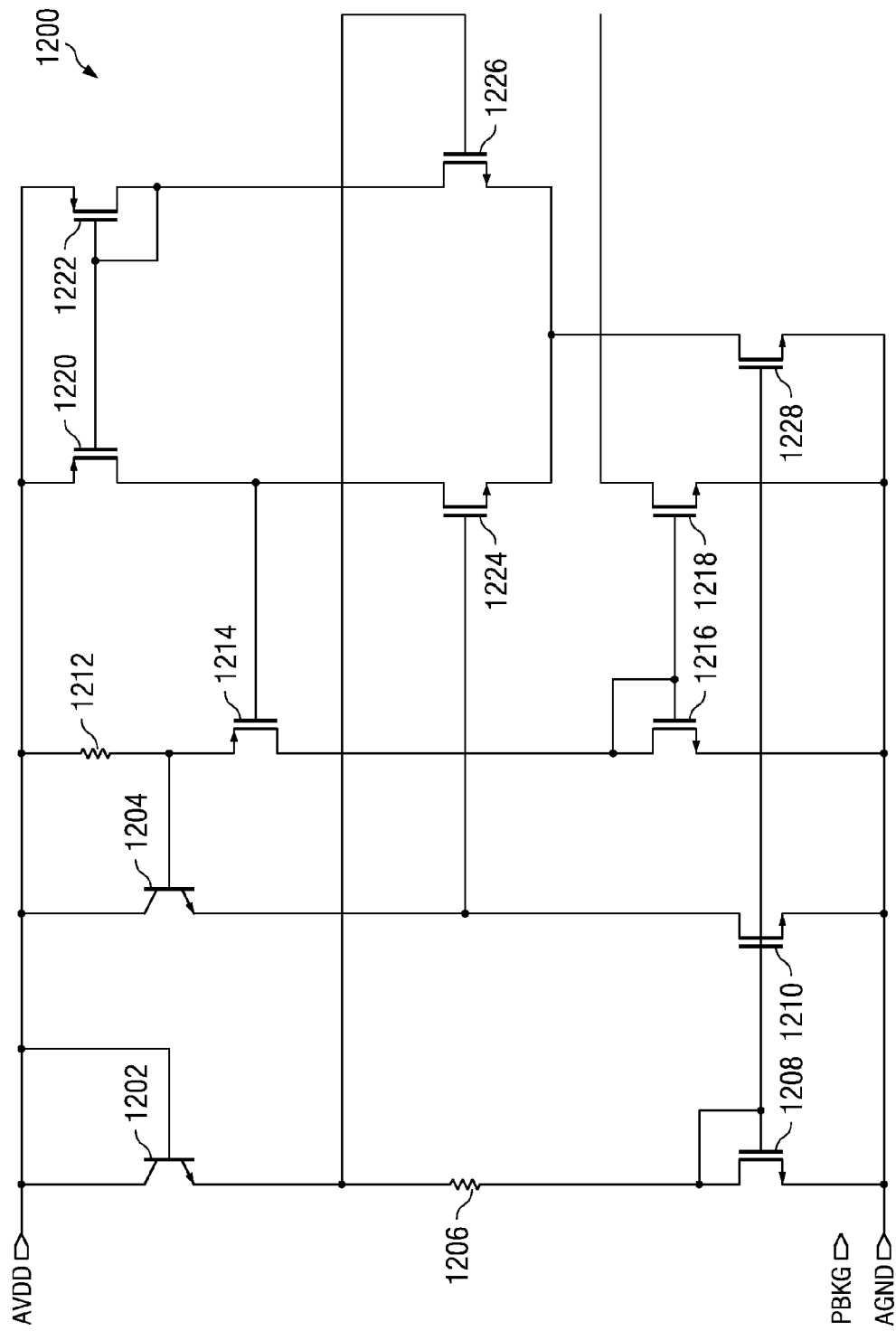
FIG. 12 is schematic diagram of an alternate example circuit to implement another example PTAT generator of FIG. 10.

FIG. 12 illustrates another example circuit 1200 to implement the PTAT generator 1010 of FIG. 3, 6, or 10. In the example of FIG. 12, the example circuit includes a voltage source 1201, an NPN transistor 1202, a ground 1203, an NPN transistor 1204, a resistor 1206, an NMOS transistor 1208, an NMOS transistor 1210, a resistor 1212, a PMOS transistor 1214, an NMOS transistor 1216, an NMOS transistor 1218, a PMOS transistor 1220, a PMOS transistor 1222, an NMOS transistor 1224, an NMOS transistor 1226, and an NMOS transistor 1228.

In the example of FIG. 12, the base and collector of the NPN transistor 1202 are coupled to the voltage source 1201 to form a diode. The collector of the NPN transistor 1202 is coupled to the voltage source 1201 and its base is coupled to the voltage source 1201 via the resistor 1212. The emitter of the NPN transistor 1202 is coupled to the drain and gate of the NMOS transistor 1208 and the gate of the NMOS transistor 1210 via the resistor 1206. The sources of both NMOS transistors 1208 and 1210 are coupled to ground 1203. The drain of the NMOS transistor 1210 is coupled to the emitter of the NPN transistor 1204 and the gate of the NMOS transistor 1224. Additionally, the emitter of the NPN transistor 1202 is coupled to the gate of the NMOS transistor 1226.

The source of the PMOS transistors 1220 and 1222 are coupled to the voltage source 1201. Additionally, the gates of the PMOS transistors 1220 and 1222 and the drain of the PMOS transistor 1222 are coupled to the drain of the NMOS transistor 1226. The source of the PMOS transistor 1220 is coupled to the gate of the PMOS transistor 1214 and the drain of the NMOS transistor 1224. The drain of the PMOS transistor 1214 is coupled to the drain of the NMOS transistor 1216 and the gates of the NMOS transistors 1216 and 1218. The sources of both NMOS transistors 1216 and 1218 are coupled to ground 1203. The sources of the NMOS transistors 1224 and 1226 are coupled to the drain of the NMOS transistor 1228. The gate of the NMOS transistor 1228 is coupled to the gates of the NMOS transistors 1208 and 1210. Similarly, the NMOS transistor 1228 is coupled to ground 1203.

In the operation of FIG. 12, a current flowing via the resistor 1206 is mirrored via the NMOS transistors 1208 and 1210, causing the NPN transistors 1202 and 1204 to have substantially the same current. In addition, the current flowing via resistor 1206 is also mirrored by NMOS transistor 1228, thus, causing the differential pair formed via the NMOS transistors 1224, 1226 to be biased. However, the NMOS transistors 1224 and 1226 are coupled to the emitters of NPN transistors 1202, 1204, respectively. The NMOS transistors 1224, 1226 thereby form a feedback path via their gates. As a result, the current flowing via the NMOS transistor 1224 causes the PMOS transistor 1214 to force the PTAT voltage across resistor 1212. As a result, because the feedback forces the same or substantially same voltage at the emitters of the NPNs the current flowing through resistor 1212 is the PTAT current and the NMOS devices 1216 causes the NMOS device 1218 to mirror the PTAT current. Thus, the example of FIG. 12 does not need a separate startup circuit.

In addition, although certain methods, apparatus, and articles of manufacture have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A method of detecting the temperature of a circuit comprising:
    generating a first current in a first circuit and a first signal based on the first current;
    generating a second current in a second circuit and a second signal based on the second current, wherein the first and second currents to have a first magnitude that is proportional-to-temperature;
    generating a third current in a third circuit having a second magnitude that is complementary-to-temperature, wherein the third current is based at least in part on the first circuit;
    generating a fourth current in a fourth circuit that is indicative of temperature base at least in part on the first signal;
    sinking the fourth current with a fifth circuit based at least in part on the second signal; and
    detecting the temperature by receiving a first and second signal based on the first and third currents, respectively and determining whether the temperature exceeds at least one temperature threshold.

2. The method of claim 1, wherein the step of generating the third current further comprises sensing a second voltage indicative of the first voltage.

3. The method of claim 1, wherein a sixth circuit has a first voltage if the fourth current exceeds the third current, and wherein the sixth circuit has a second voltage if the third current exceeds the fourth current.

4. The method of claim 3, wherein the sixth circuit is a Schmitt trigger.

5. An apparatus comprising:
    a first circuit that generates a first current that is proportional-to-temperature;
    a second circuit that is coupled to the first circuit and that generates a second current that is complementary-to-temperature;
    a third circuit that is coupled to the second circuit so as to receive a first signal and a second signal that are based at least in part on the first and second currents, respectively, wherein the third circuit generates a fourth current based at least in part on the first signal, and wherein the fourth current is indicative of temperature, and wherein the third circuit sinks the fourth current based at least in part on the second signal, and wherein the third circuit determines whether the temperature exceeds at least one threshold.

6. The apparatus of claim 5, wherein the third circuit further comprises an output circuit that indicates the greater of the first and second currents.

7. The apparatus of claim 6, wherein the first circuit further comprises:
    a first diode-connect bipolar transistor;
    a resistor that is coupled to the first diode-connected bipolar transistor;
    a second diode-connect bipolar transistor; and
    a control circuit that is coupled to the second diode-connect bipolar transistor and the resistor.

8. The apparatus of claim 7, wherein the control circuit further comprises:
    a first current mirror that is coupled to the second diode-connect bipolar transistor and the resistor; and
    a second current mirror that is coupled to the first current mirror.

9. The apparatus of claim 8, wherein the resistor further comprises a first resistor, and wherein the second circuit further comprises:
    a second resistor;
    a first MOS transistor that is coupled to the second resistor at its source and the first current mirror at its gate;
    a second MOS transistor that is coupled to the drain of the first MOS transistor at its drain and that is coupled to the second current mirror at its gate;
    a third current mirror that is coupled to the source of the first MOS transistor; and
    a third MOS transistor that is coupled to the third current mirror at its drain and that is coupled to the second current mirror at its gate.

10. The apparatus of claim 9, wherein the third circuit further comprises:
- a fourth MOS transistor that is coupled to the third current mirror at its gate and the output circuit at its drain;
- a fifth MOS transistor that is coupled to the third current mirror at its gate and the output circuit at its drain;
- a sixth MOS transistor that is coupled to the drain of the first MOS transistor at its gate and the output circuit at its drain; and
- a seventh MOS transistor that is coupled to the drain of the first MOS transistor at its gate and the output circuit at its drain.

11. The apparatus of claim 10, wherein the output circuit further comprises:

- a first Schmitt trigger that is coupled to the drains of the fourth and sixth MOS transistors; and

- a second Schmitt trigger that is coupled to the drains of the fifth and seventh MOS transistors.

* * * * *